United States Patent [19]

Nagata

[11] Patent Number: 5,347,348
[45] Date of Patent: Sep. 13, 1994

[54] IMAGE FIXING APPARATUS WITH DETECTOR FOR DETECTING MOVEMENT OF ENDLESS BELT

[75] Inventor: Tsunetoshi Nagata, Yokohama, Japan

[73] Assignee: Canon Kabushiki Kaisha, Tokyo, Japan

[21] Appl. No.: 167,623

[22] Filed: Dec. 16, 1993

Related U.S. Application Data

[63] Continuation of Ser. No. 50,997, Apr. 22, 1993, abandoned, which is a continuation of Ser. No. 892,407, May 29, 1992, abandoned, which is a continuation of Ser. No. 588,326, Sep. 26, 1990, abandoned.

[30] Foreign Application Priority Data

Sep. 27, 1989 [JP] Japan .................................. 1-251235

[51] Int. Cl.[5] ............................................. G03G 15/20
[52] U.S. Cl. .................................... 355/285; 219/216; 198/810
[58] Field of Search ............... 355/285, 286, 288, 282, 355/295, 212; 219/216, 388; 198/806–808, 810

[56] References Cited

U.S. PATENT DOCUMENTS

| | | | |
|---|---|---|---|
| 2,725,757 | 12/1955 | Murphy | 198/806 X |
| 3,159,268 | 12/1964 | Dyke | 198/807 |
| 3,312,335 | 4/1967 | Paris et al. | 198/807 |
| 3,368,665 | 2/1968 | Jinkins | 198/806 |
| 3,710,927 | 1/1973 | Alsted | 198/807 |
| 3,810,735 | 5/1974 | Moser | 219/216 X |
| 3,811,828 | 5/1974 | Ohta et al. | 219/216 X |
| 3,913,729 | 10/1975 | Andrews | 198/807 |
| 4,027,966 | 6/1977 | Jordan | 198/806 X |
| 4,061,222 | 12/1977 | Rushing | 198/807 |
| 4,173,904 | 11/1979 | Repetto | 198/807 X |
| 4,429,985 | 2/1984 | Yokota | 355/212 |
| 4,483,607 | 11/1984 | Nagayama | 355/212 |
| 4,527,686 | 7/1985 | Satoh | 198/807 |
| 4,566,779 | 1/1986 | Coli et al. | |
| 4,780,742 | 10/1988 | Takahashi et al. | 219/216 X |

FOREIGN PATENT DOCUMENTS

| | | | |
|---|---|---|---|
| 180106 | 5/1986 | European Pat. Off. | 198/807 |
| 1181123 | 11/1964 | Fed. Rep. of Germany | 198/806 |

*Primary Examiner*—R. L. Moses
*Attorney, Agent, or Firm*—Fitzpatrick, Cella, Harper & Scinto

[57] ABSTRACT

An image fixing apparatus includes a heater; a rotatable endless film, wherein an unfixed image on a recording material is heated and fixed by heat from the heater through the endless film; a displaceable member made of heat resistive resin material displaceable in accordance with movement of the endless film in a direction perpendicular to movement of the endless film; detecting element for detecting the displaceable member, the detecting element detecting the displaceable member to detect a lateral shift of the endless film.

8 Claims, 5 Drawing Sheets

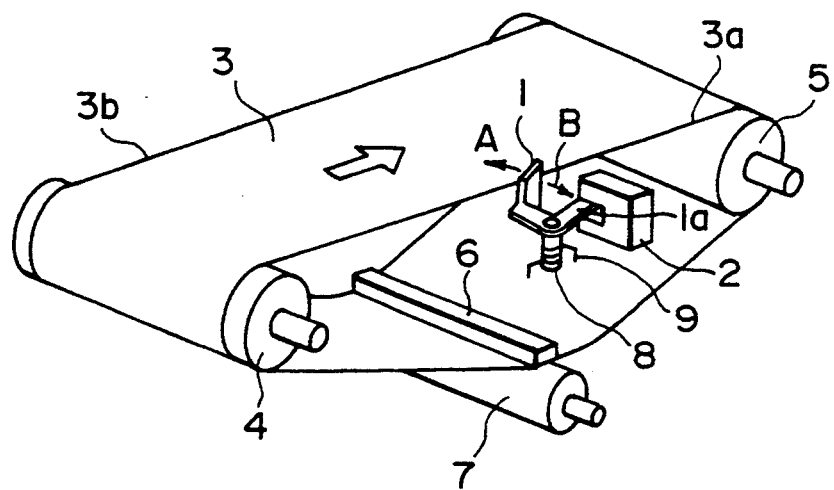
F I G. 1
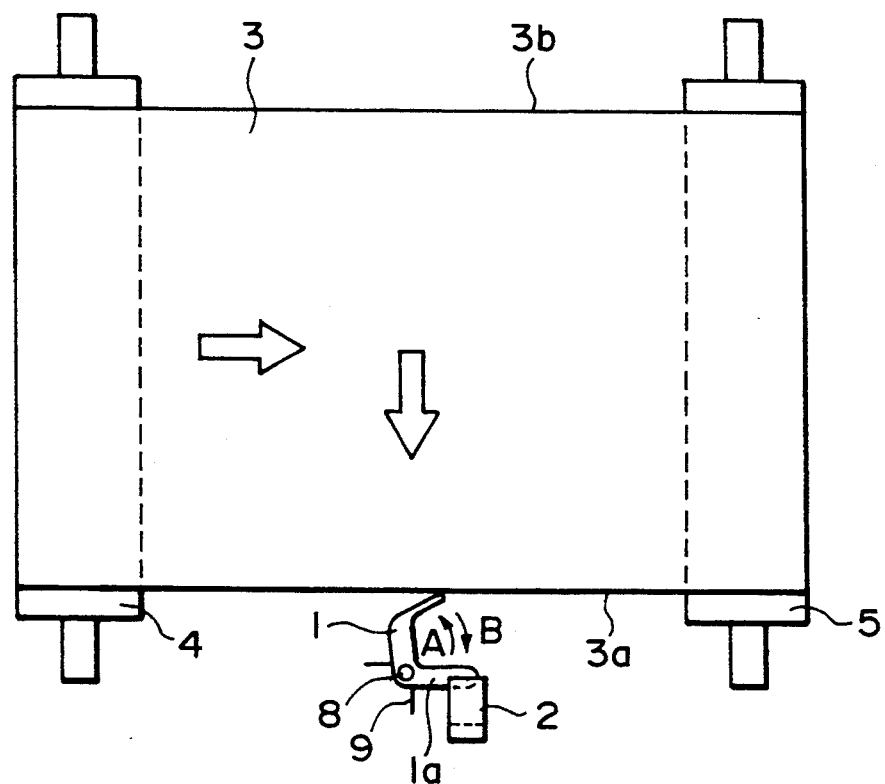
F I G. 2

IMAGE FIXING APPARATUS WITH DETECTOR FOR DETECTING MOVEMENT OF ENDLESS BELT

This application is a continuation of application Ser. No. 08/050,997 filed Apr. 22, 1993, which is a continuation of 07/892,407 filed May 29, 1992, which is a continuation of 07/588,326 filed Sep. 26, 1990, now abandoned.

FIELD OF THE INVENTION AND RELATED ART

The present invention relates to an image fixing apparatus for an image forming apparatus, wherein an endless film is used as an image fixing film, more particularly to an image fixing apparatus provided with means for detecting a lateral end of the image fixing film.

An image fixing apparatus for an image forming apparatus, using an endless image fixing film is proposed in U.S. Ser. No. 668,333, which is a continuation of U.S. Ser. No. 206,767 now abandoned which has been assigned to the assignee of this application, for example.

In the apparatus, the image fixing film is stretched between a driving roller and a follower roller or the like, and it rotates with the movement of the recording material upon the image fixing operation. In this type of apparatus, when the film rotates, it laterally shifts, that is, it deviates in a direction perpendicular to the movement direction of the film, with the result of a production of crease of the film or the tearing thereof.

FIG. 11 shows an example of an image forming apparatus wherein an attempt is made to provide a solution to the problem. In this Figure, reference numeral 22, 23, 24, 25, 26 and 27 designate a sensor, an endless film, a driving roller, a follower roller, a heater and a pressing roller, respectively. References 23a and 23b designate film ends.

This apparatus is provided with the sensor 22 to detect the film 23 laterally shifting during the rotation of the endless film 23 (in the direction E in FIG. 11, for example). More particularly, when the sensing light of the sensor 22 is blocked by the film 23, the sensor 22 detects the end of the film 23a. The provision of the sensor (detecting means) 22, as described hereinbefore, is to prevent the damage of the film caused by the lateral shift thereof by the rotation of the film 23. The lateral shift of the film 23 is directly detected by the sensor 22, and when the lateral shift exceeds a predetermined level, the film 23 is positively shifted to the opposite direction by displacing the driving roller 24 or the follower roller 25 up or down. By doing so, the film 23 is retained within a predetermined range.

However, the apparatus of FIG. 11 involves the following problems.

First, in the image fixing apparatus for a copying machine, for example, the temperature becomes high (approximately 100° C.) in the neighborhood of a heater 26 for heat-fixing the toner (developer) on the recording material. Therefore, the sensor 22 disposed across a lateral end portion of the film is placed under the high temperature condition. Therefore, a heat durable sensor has desired, but it is high cost.

Secondary, when paper is passed through the image fixing apparatus, the moisture contained in the paper is evaporated by the heat with the result of production of water dew, which is not preferable for the sensor 22 because it can result in malfunction of the sensor 22.

The sensing system in which the endless film 23 is passed through sensing elements, involves the problem of easy production of dew.

SUMMARY OF THE INVENTION

Accordingly, it is a principal object of the present invention to provide an image fixing apparatus in which the lateral shift of the endless film is detected properly.

It is another object of the present invention to provide an image fixing apparatus wherein the lateral shift of the endless film is detected substantially free from the influence of the heat and moisture.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a perspective view of an image fixing apparatus according to a first embodiment of the present invention.

FIG. 2 is a top plan view of an image fixing apparatus of FIG. 1.

DESCRIPTION OF THE PREFERRED EMBODIMENTS

Figure 3:
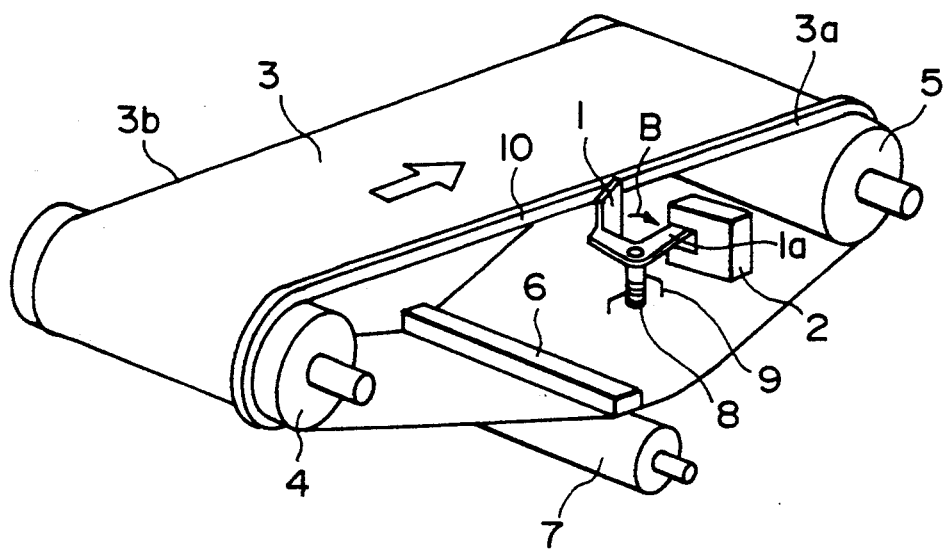
FIG. 3 is a perspective view of an image fixing apparatus according to a second embodiment of the present invention.

The preferred embodiments of the present invention will be described in conjunction with the accompanying drawings, wherein the same reference numerals are assigned to the elements having the corresponding functions.

Referring to FIGS. 1 and 2, there is shown an image fixing apparatus according to a first embodiment of the present invention. FIG. 1 is a perspective view.

In FIG. 1, an end detecting means includes a displaceable lever (displacement transmitting means), which is made of PPS (polyphenylene sulfide), PAI (polyamide imide) or another heat resistive resin material. The detecting device further comprises a non-contact type photosensor 2. The fixing apparatus comprises an image fixing film 3 in the form of a endless film or belt, a driving roller 4 which is driven from a driving source through a gear or chain, a follower roller 5 rotatable following movement of the film 3, and a heater 6 (heating source). The heater 6 has a linear heat generating member extended in a direction perpendicular to a movement direction of the endless film. The linear heat generating element is closely contacted to the endless film 3. From the standpoint of efficiently using the film 3, the length of the heater 6 is preferably larger than the width of the film 3. A pressing roller 7 cooperates with the endless film 3 to form a nip therebetween, through which the recording medium carrying the toner image is passed, by which the toner is fixed on the recording material. During the fixing operation, the heater 6 is fixed, and slides relative to and in contact to the endless film. A coil spring 9 is wrapped around a rotational center shaft 8 of the lever 1.

In FIG. 1, bearings for the driving roller 4, the follower roller 5 and the pressing roller 7, and side plates for supporting the lever 1, the sensor 2 and the heater 6, are omitted for the sake of simplicity.

FIG. 2 is a top plan view of the image fixing apparatus of FIG. 1.

The lever 1 is urged in the direction A by the coil spring 9 so as to be contacted to an end 3a of the endless film 3. When the driving roller 4 starts to rotate with this state, that is, when the image fixing operation starts, the endless film 3, the follower roller 5 and the pressing roller 7 rotate. After the rotational motion continues, the endless film 3 gradually shifts in the lateral direction, sooner or later.

FIG. 2 shows an example wherein the endless film is shifted toward front (arrow). When the endless film 3 shifts laterally in this direction, the lever 1 is moved in the direction B by the film end 3a. Then, the free end 1a of the lever enters across the light path of the sensor 2, by which the lateral shift of the endless film 3 is detected.

As described, the sensor 2 does not directly detect the film 3, but it detects the lever 1 made of heat resistive resin material in order to detect the lateral shift of the film 3. Therefore, the heat from the film 3 is not easily transmitted to the sensor 2, and therefore, the thermal damage to the sensor 2 can be prevented.

As shown in FIGS. 1 and 2, the sensor 2 is disposed outside of the film 3 in the direction of the lateral shift of the film 3 and away from the film 3. As will be understood from FIG. 1, the sensor 2 is disposed outside the heater 6 in the direction of the lateral shift of the film 3.

By disposing the sensor 2 outside the film 3 which accumulates the heat and outside the heater 6 with spaces, and therefore, the sensor 2 is protected from the thermal damage, and in addition, the sensor 2 is protected from the dew produced by evaporation of the moisture contained in the recording material. Accordingly, the lateral shift of the film can be detected with certainty without the possibility of the sensor 2 malfunction.

Upon detection of the lateral shift of the film by the sensor 2, the film 3 is positively shifted in the direction opposite to the lateral shift by displacing the driving roller 4 or the follower roller 5 in the upward or downward direction, by which the lateral position of the film 3 is maintained within a predetermined range.

In the example of FIGS. 1 and 2, the lateral shift position detecting device is disposed only at one side of the endless film 3, but it may be provided at each of the sides of the endless film 3. The case of very thin endless film 3, will be described. When the lever 1 is continuously urged to the film end 3a when the endless film 3 is at rest, as shown in FIG. 1, the localized force is continuously applied, and therefore, the end portion 3a of the film is liable to be bent or folded back. In order to prevent this, the end portion 1a of the lever is retracted in the direction B of FIG. 1 during non-operation of the fixing apparatus to prevent contact between the film end 3a and the lever 1.

Referring to FIG. 3, an image fixing apparatus according to a second embodiment of the present invention will be described. In this Figure, the same reference numerals as in FIG. 1 are assigned, and the detailed description thereof is omitted for the sake of simplicity.

Figure 4:
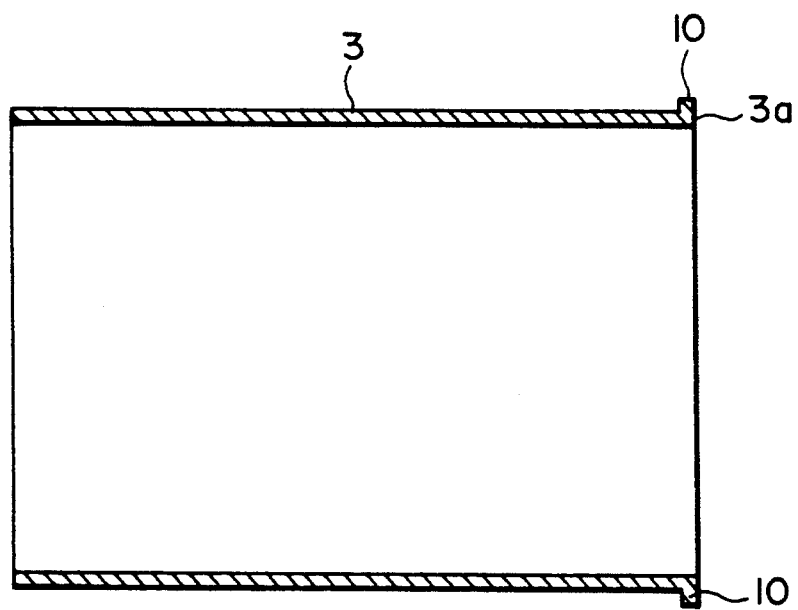
FIG. 4 is a sectional view of an endless film used in the apparatus of FIG. 3.

In the second embodiment, the endless film 3 is provided with a reinforcing rib 10 along the entire circumference thereof at one lateral end 3a thereof. FIG. 4 is a sectional view of an endless film 3 of FIG. 3. By the provision of the rib 10, the end 3a of the film is reinforced, so that the film 3 is not bent or creased even if the end of the film is always in contact with the lever 1.

The reinforcing rib may be provided at each of the lateral ends of the endless film 3, depending on the positions of the sensor means.

Figure 5:
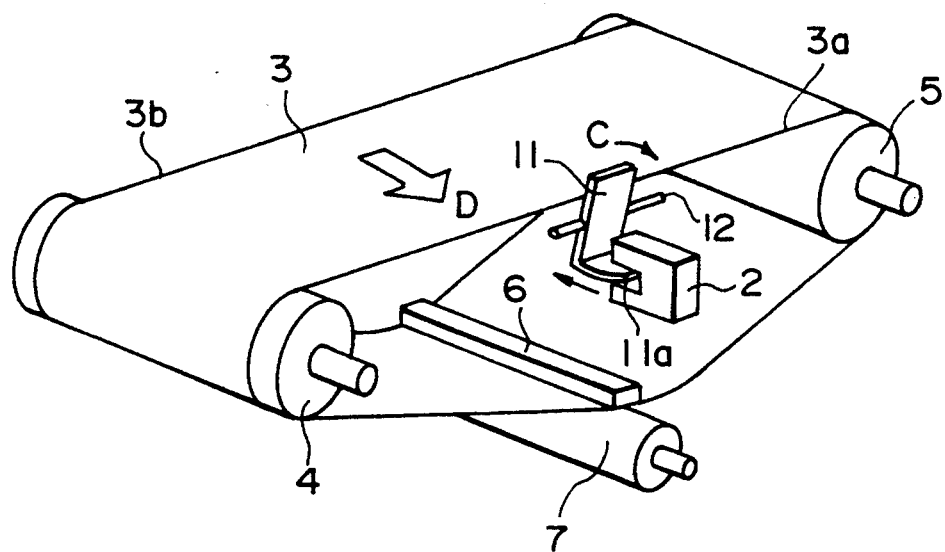
FIG. 5 is a perspective view of an image fixing apparatus according to a third embodiment of the present invention.

Referring to FIG. 5, there is shown an image fixing apparatus according to a third embodiment, which is different in the structure of the lever. The lever 11 is rotatable about a central shaft 12. Normally, the end 11a of the lever is in the sensor 2. When the endless film 3 is laterally shifted in the direction D in FIG. 5, the lever 11 rotates in the direction C. The lateral shift of the endless film 3 is detected by the end 11a of the lever moves away from the sensor 2.

Figure 6:
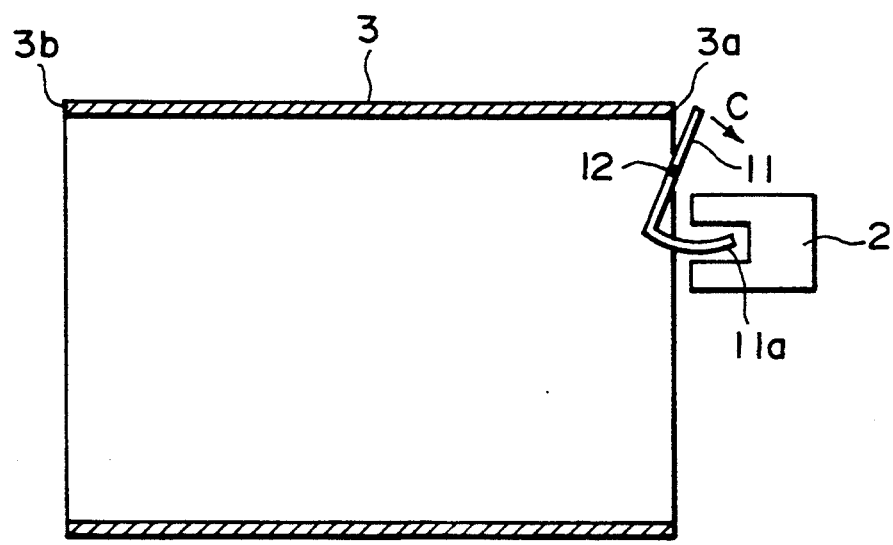
FIG. 6 is a partial sectional view of the image fixing apparatus of FIG. 5.

FIG. 6 is a sectional view of the apparatus of FIG. 5, illustrating motion of the lever 11. As will be understood, the lever 11 is rotatable by the weight thereof. Thus, the necessity for the coil spring 9 is eliminated, whereby the structure of the apparatus is simplified. The lever 11, similarly to the lever 1, is made of heat resistive resin material such as PPS or PAI. The sensor 2 is disposed outside the ends of the film. The same advantageous effects can be provided by this embodiment.

Figure 7:
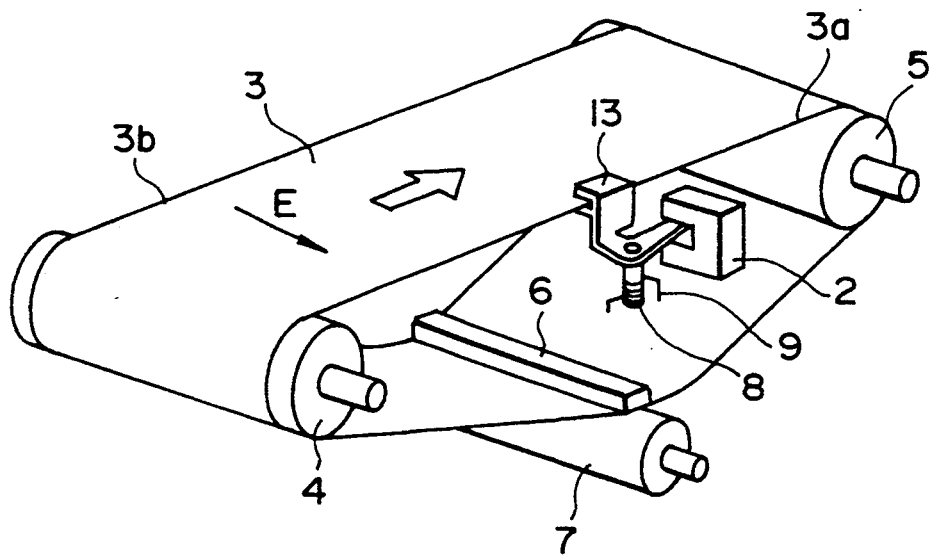
FIG. 7 is a perspective view of an image fixing apparatus according to a fourth embodiment of the present invention.
Figure 8:
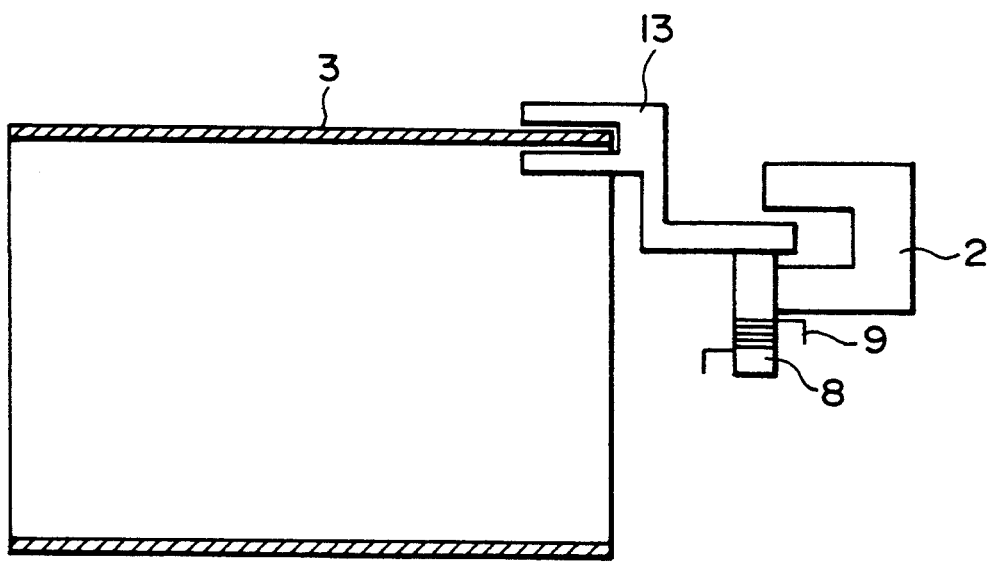
FIG. 8 is a partial sectional view of the image fixing apparatus of FIG. 7.

Referring to FIG. 7, there is shown an image fixing apparatus according to a fourth embodiment of the present invention. FIG. 8 is a sectional view of an image fixing apparatus of FIG. 7. In this embodiment, the endless film 3 is sandwiched between fingers of a fork-shaped lever 13. By doing so, the bending or folding-back of the endless film 3 is prevented.

Figure 9:
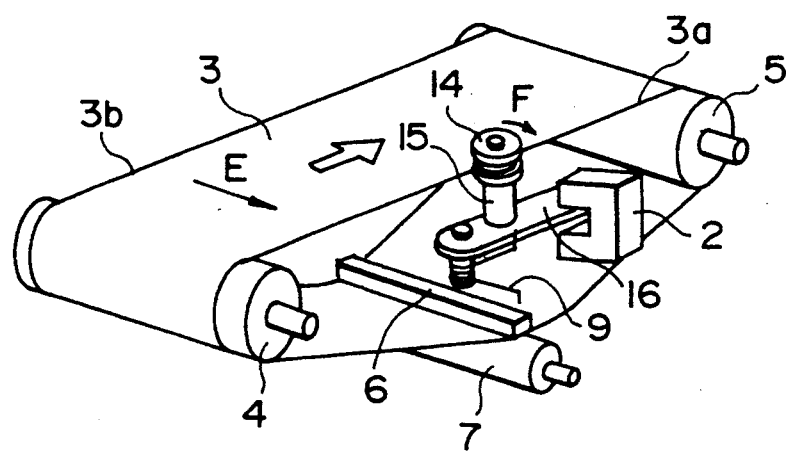
FIG. 9 is a perspective view of an image fixing apparatus according to a fifth embodiment of the present invention.
Figure 10:
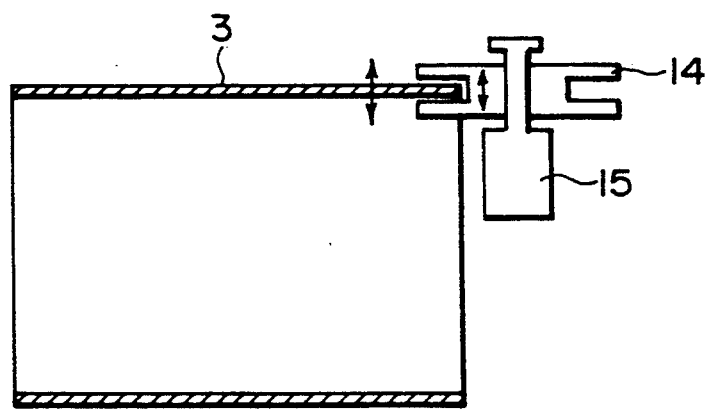
FIG. 10 is a partial sectional view of the image fixing apparatus of FIG. 9.
Figure 11:
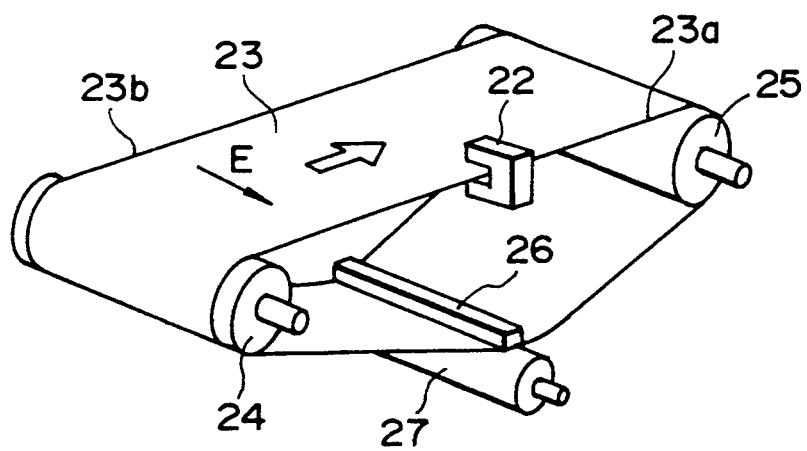
FIG. 11 is a perspective view of an example of an image fixing apparatus from which the present invention starts.

FIG. 9 shows a fifth embodiment of the present invention. FIG. 10 is a sectional view of the apparatus of FIG. 9.

A pulley 14 is rotatably mounted on a shaft 15 which in turn is mounted on the lever 16. The pulley 14 is rotatable while sandwiching the endless film 3 between its circumferential ribs. The pulley 14 rotates in contact with the end 3a of the film. In addition, the pulley is movable up and down in this Figure, and therefore, the damage to the film end 3a is further smaller than in the fourth embodiment (FIG. 7). FIG. 10 illustrates the vertical movement of the pulley 14. The movability of the pulley 14 also permits free movement of the film in the vertical direction when the lateral shift is effected by shifting up or down the driving roller 4 or the follower roller 5.

The lever 13, the pulley 14, the shaft 15 and the lever 16 are made of heat resistive resin material. In any of the foregoing embodiments, the detecting means may be provided at each lateral side of the endless film 3.

While the invention has been described with reference to the structures disclosed herein, it is not confined to the details set forth and this application is intended to cover such modifications or changes as may come within the purposes of the improvements or the scope of the following claims.

What is claimed is:

1. An image heating apparatus, comprising:

a heater;

an endless belt movable in sliding contact with said heater;

a first roller, disposed downstream of said heater with respect to a movement direction of said endless belt, said endless belt being stretched around said first roller;

a second roller, disposed upstream of said heater with respect to the movement direction of said endless belt, said endless belt being stretched around said second roller;

a displaceable member contacting an edge of said endless belt at a position downstream of said first roller and upstream of said second roller, said movable means comprising heat insulative resin; and a photosensor for optically detecting said displaceable member to determine a lateral shift of said endless belt.

2. An apparatus according to claim 1, further including means for laterally shifting said endless belt in a direction opposite from a direction of a lateral shift detected by said photosensor.

3. An apparatus according to claim 2, wherein said lateral shifting means laterally shifts the endless belt such that said endless belt is maintained in a predetermined range.

4. An apparatus according to claim 1, wherein said first roller drives said endless belt, and said second roller is driven by said endless belt.

5. An apparatus according to claim 1, wherein the heat insulative resin is pholyphenylene sulfide or polyamide.

6. An apparatus according to claim 1, wherein said displaceable means comprises a rotatable pulley contactable to said endless belt.

7. An apparatus according to claims 1, said endless belt comprises a reinforced lateral edge.

8. An apparatus according to claim 1, wherein said photosensor is disposed outside said heater in a direction of lateral shift of said endless belt.

* * * * *

UNITED STATES PATENT AND TRADEMARK OFFICE
CERTIFICATE OF CORRECTION

PATENT NO. : 5,347,348

DATED : September 13, 1994

INVENTOR(S) : NAGATA

It is certified that error appears in the above-indentified patent and that said Letters Patent is hereby corrected as shown below:

Column 1

Line 30, "a" should be deleted
Line 31, "crease" should read --a crease--.
Line 34, "numeral 22," should read --numerals 22,--.
Line 63, "has" should read --is-- and "is" should read --has--.
Line 64, "Secondary," should read --Secondly,--.
Line 67, "preferable" should read --desirable--.

Column 3

Line 49, "and therefore," should be deleted.

Column 4

Line 30, "moves" should read --as it moves--.
Line 58, "further" should be deleted.

UNITED STATES PATENT AND TRADEMARK OFFICE
CERTIFICATE OF CORRECTION

PATENT NO. : 5,347,348

DATED : September 13, 1994

INVENTOR(S) : NAGATA

It is certified that error appears in the above-indentified patent and that said Letters Patent is hereby corrected as shown below:

<u>Column 6</u>

Line 16, "pholyphenylene" should read --polyphenylene--.
Line 21, "claims 1, said" should read --claim 1, wherein said--.

Signed and Sealed this

Twenty-first Day of February, 1995

Attest:

BRUCE LEHMAN

Attesting Officer

Commissioner of Patents and Trademarks